United States Patent [19]

Iwasa

[11] Patent Number: 4,774,284

[45] Date of Patent: Sep. 27, 1988

[54] WATER-SWELLING COMPOSITION

[75] Inventor: Tadanobu Iwasa, Aichi, Japan

[73] Assignee: Toyoda Gosei Co., Ltd., Nishikasugai, Japan

[21] Appl. No.: 51,242

[22] Filed: May 13, 1987

Related U.S. Application Data

[63] Continuation-in-part of Ser. No. 845,835, Mar. 28, 1986, abandoned.

[30] Foreign Application Priority Data

Mar. 29, 1985 [JP] Japan .................................. 60-67108

[51] Int. Cl.$^4$ ............................................. C08L 29/04
[52] U.S. Cl. ........................................ 525/57; 524/45; 524/47; 524/52; 524/53; 524/503; 524/507; 525/54.26; 525/58; 525/123
[58] Field of Search ................. 524/45, 47, 52, 53, 524/503, 507; 525/54.26, 123, 57–58

[56] References Cited

U.S. PATENT DOCUMENTS

| | | | |
|---|---|---|---|
| 3,928,255 | 12/1975 | Milkovich et al. | 524/504 |
| 3,975,350 | 8/1976 | Hudgin et al. | 524/111 |
| 3,994,868 | 11/1976 | Inomata et al. | |
| 4,085,168 | 4/1978 | Milkovich et al. | 524/910 |
| 4,404,324 | 9/1983 | Fock et al. | 525/123 |
| 4,408,008 | 10/1983 | Markusch | 524/507 |
| 4,420,588 | 12/1983 | Yoshioka | 525/93 |
| 4,476,276 | 10/1984 | Gasper | 524/507 |
| 4,491,646 | 1/1985 | Gruber et al. | 525/123 |
| 4,532,316 | 7/1985 | Henn | 528/80 |
| 4,541,871 | 9/1985 | Obayashi et al. | 525/123 |
| 4,590,240 | 5/1986 | Streeter et al. | 525/123 |
| 4,603,899 | 8/1986 | Iwasa | 428/122 |

FOREIGN PATENT DOCUMENTS

| | | | |
|---|---|---|---|
| 1133650 | 10/1982 | Canada | 525/123 |
| 0018455 | 2/1980 | Japan | 525/123 |

Primary Examiner—Herbert J. Lilling
Attorney, Agent, or Firm—Cushman, Darby & Cushman

[57] ABSTRACT

There is disclosed a water-swelling composition which comprises polyolefinpolyol-ethylene oxide addition product, a water-absorbing polymer and an isocyanate. The composition contains a water-absorbing polymer in an amount of from 5 to 200 parts by weight and an isocyanate in an amount of from 5 to 50 parts by weight, per 100 parts by weight of a polyolefinpolyol-ethylene oxide addition product. The composition can be used as a sealant in places which must be water or moisture tight in vehicles, buildings and various machines since it is capable of speedily swelling when contacted with water.

2 Claims, No Drawings

WATER-SWELLING COMPOSITION

This is a continuation-in-part of application Ser. No. 845,835, filed Mar. 28, 1986, now abandoned.

BACKGROUND OF THE INVENTION

1. Field of the Invention

The present invention relates to a water-swelling composition. In particular, it relates to a water-swelling composition usable for places which must be water or moisture tight in vehicles, buildings, various machines, and the like.

2. Description of the Related Art

In vehicles, buildings, machines, etc., places which must be water or moisture tight are filled with a sealant for the purpose of preventing the penetration therefrom of water and moisture.

Among sealants known in the prior art, there are water-swelling sealants which are consisted of a polymeric base (mainly a rubber) and a water-swelling polymer, such as starch and a polyacrylate.

When a sealant is used for a long period of time in vehicles, buildings, machines, etc., gaps or hiatuses may be formed at sealed places because of its deterioration and/or contraction caused by the influence of ultraviolet rays, heat or the like, or because of deformation of vehicles, buildings, machines, etc. As a result, its sealing function tends to be lowered with the lapse of time. However, when contacted with water or moisture, a water-absorbing polymer contained therein swells to increase the bulk of the sealant. As a result, gaps or hiatuses formed in sealed places can be filled up automatically and, hence, the sealing function of a water-swelling sealant can be maintained over an extended period of time.

However, a long period of time up to, e.g., one week, is required for the completion of such a swelling since a rubber, the base material of such a sealant, is an inherently hydrophobic substance and incompatible with water.

Such a water-swelling sealant may, therefore, be of no use when a speedy swelling is required as in the case of a rainfall. Because of this reason, water-swelling sealants have been employed only for uses where rapid protection against water is not required.

SUMMARY OF THE INVENTION

It is therefore an object of the invention to provide a water-swelling composition capable of swelling speedily at a high swelling rate when contacted with water.

It is another object of the invention to provide a water-swelling sealant capable of speedily swelling when contacted with water, to fill up the gaps formed in wind frames of vehicles and buildings or at junctions of various machines.

It has now been found that the above objects of the invention can be achieved by a water-swelling composition comprising from 5 to 200 parts by weight of a water-absorbing polymer and from 5 to 50 parts by weight of isocyanates, per 100 parts by weight of an addition product of a polyolefinpolyol and ethylene oxide.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

The polyolefinpolyol used in the present invention is liquid or solid containing hydroxyl groups at the molecular terminals and having an average molecular weight of 1,000 to 5,000. The average number of hydroxyl groups per molecule is 1.5 to 5.0 (advantageously 1.8 to 3.0) and the main chain has a degree of saturation greater than 90% (advantageously greater than 98%). Commercially available examples include "Polytail H" (solid) and "Polytail HA" (liquid) made by Mitsubishi Chemical Industries Ltd. Moreover, U.S. Pat. No. 3,994,868 discloses a useful polyolefinpolyol.

The polyolefinpolyol is produced by hydrogenating in the usual way, a diene polymer or copolymer having hydroxyl groups obtained by the conventional polymerization process for telechelic polymers. The diene used as a raw material for this polymer includes conjugated dienes such as 1,3-butadiene, isoprene, chloroprene, 1,3-pentadiene, and 2,3-dimethylbutadiene-1,3. The monomer to be copolymerized with the diene in the production of the copolymer includes vinyl monomers such as styrene, vinyltoluene, methyl acrylate, methyl methacrylate, and vinyl chloride.

One of the features of the polyolefinpolyols lies in that hydroxyl groups contained therein are capable of undergoing various reactions with various substances.

In addition, the polyolefinpolyols are highly compatible with rubbers having excellent weather resistant, aging resistant and ozone resistance properties, such as vulcanized rubbers, ethylene-propylene-diene terpolymer rubbers and ethylene-propylene copolymer rubbers. Polyolefinpolyols also have the advantage that shaped rubber products with excellent characteristics can be obtained from a mixture of one or more of the polyolefinpolyols with one or more rubbers or by applying the polyolefinpolyols per se on the surface of a shaped rubber product. The polyolefinpolyols, therefore, can be most suitable as a base for a water-swelling composition.

It has been found by the inventor that the polyolefinpolyols undergo addition reactions with ethylene oxide in the presence of an amine catalyst and give an extremely hydrophilic product.

It was also found that when the addition product was blended with a vinyl alcohol-sodium acrylate copolymer (a water-absorbing polymer) and an isocyanate (cross-linking agent), and subjected to a hardening reaction, there can be obtained a product which, upon immersion into water, shows an extremely large swelling rate.

The inventor has carried out similar experiments by use of various water-absorbing polymers, such as carboxymethyl celluloses, hydrolyzed polyacrylonitriles, hydrolyzed polyacrylic acids, a mixture of starch and hydrolyzed polyacrylonitriles and a mixture of starch and sodium polyacrylates, and attained almost same results. These water-absorbing polymers can be blended in an amount of from 5 to 200 parts by weight, preferably from 50 to 200 parts by weight, per 100 parts by weight of said polyolefinpolyol-ethylene oxide addition products. When the amount of the water-absorbing polymer is more than 200 parts by weight, the resulting composition will have an excessive swelling. On the other hand, at least 5 parts by weight of water-absorbing polymers is required in order to attain a practical swelling rate.

The amount of isocyanates to be used as a cross-linking agent is preferably around 10 parts by weight per 100 parts by weight of said polyolefinpolyol-ethylene oxide addition products. As examples of isocyanates to be used in the invention, mention may be made of diisocyanates, such as tolylenediisocyanate, 4,4'-diphenylmethanediisocyanate, hydrogenated 4,4'-diphenylmethanediisocyanate, 1,5-naphthalene-diisocyanate, xylenediisocyanate, hydrogenated xylene-disocyanate, 1,6-hexamethylenediisocyanate and isophorone diisocyanate; and multifunctional isocyanates, such as 4,4',4''-triphenylmethanetriisocyanate and tris-(p-isocyanatephenyl)-thiophosphate.

In order to accelerate the cross-linking reaction of the isocyanates, the reaction mixture may be subjected to heating. It is also possible to use a hardening accelerator, such as tin octylate, etc., in order to make the cross-linking reaction proceed rapidly at room temperature. Upon production of the water-swelling composition of the invention, said polyolefinpolyol-ethylene oxide addition product and said water-absorbing polymer may be kneaded in a kneader, and the isocyanate may then be incorporated therein to effect the cross-linking reaction. It is also possible to incorporate into the kneaded product such additives for rubbers as (1) antioxidants, e.g., 2,6-di-t-butyl-p-cresol, 2,6-di-t-butyl-4-ethylphenol, etc.; (2) age resistors, e.g., phenyl-α-naphthylamine, N,N'-diphenyl-p-phenylenediamine, etc.; (3) fillers, e.g., carbon black, calcium carbonate, clay and hydrated silicic acid; and (4) plasticizers, e.g., dioctylsebacate, mineral oils, etc.

The thus obtained water-swelling composition can be used as a sealant as it is or can be used after being additionally incorporated with an organic solvent to lower its viscosity.

By the application of the water-swelling composition to window frames in vehicles and buildings or at junctions in various machines, there can be prevented the penetration of water and moisture upon raining through gaps formed in the window frames and the junctions since the composition swells quite speedily when contacted with water or a highly humid atmosphere.

In addition, the water-swelling composition of the invention is highly compatible with natural rubber and various synthetic rubbers. The composition can, therefore, be used in the form of a mixture with a rubber for the production of a shaped product, such as packings, gaskets and weather strips (sealants for window frames of rolling stocks). Similar water and moisture proof effects can be attained by the use of such a shaped product.

EXAMPLE

One hundred (100) parts by weight of polyolefinpolyol-ethylene oxide addition product containing hydroxyl groups at the molecular terminals thereof (hydroxyl value=28.2 mgKOH/g) and having an average molecular weight of 1,000 to 5,000, 100 parts by weight of vinyl alcohol-sodium acrylate copolymer, 30 parts by weight of FEF carbon black and 20 parts by weight of paraffinic process oil (softening agent) were kneaded in an 8 inch open roll at a temperature of 30° C. for 10 minutes.

In the above kneading, "MKU-111" (trade name by Mitsubishi Chemical Industries, Ltd.) was used as said addition product, and "Sumika Gel SP-520" (trade name by Sumitomo Chemical Co., Ltd.) was used as said vinyl alcohol-sodium acrylate copolymer.

To the kneaded product was added 10 parts by weight of 1,6-hexamethylenediisocyanate, and the resulting mixture was heated at a temperature of 150° C. for 1 hour to give a Water-Swelling Composition A.

Water-Swelling Compositions B, C, D and F were prepared in a similar manner as above, except that Sumika Gel SP-520 was used in the amounts shown in Table 1. In this and other tables, "parts" indicates "parts by weight."

TABLE 1

| Water-Swelling Composition | Sumika Gel SP-520 |
|---|---|
| B | 30 parts |
| C | 50 parts |
| D | 100 parts |
| E | 150 parts |
| F | 200 parts |

In Comparative Examples 1 to 4 described hereinbelow are shown water-swelling sealants pertaining to related prior arts.

COMPARATIVE EXAMPLE 1

In a BR type Bumbury's mixer were mixed ingredients shown in Table 2 and the resulting mixture was kneaded in an 8 inch open roll at a temperature of 50° C. for 10 minutes. To this mixture was then added 2 parts by weight of sulfur, 1 part by weight each of 2-mercaptobenzothiazole, tetramethylthiuramdisulfide and zinc dimethyldithiocarbamate (vulcanization accelerators). After kneading, the resulting mixture was allowed to stand at a temperature of 150° C. for 30 minutes to effect the vulcanization thereof.

TABLE 2

| EPDM | 100 parts |
|---|---|
| FEF carbon black | 60 parts |
| Precipitated calcium carbonate | 30 parts |
| Paraffinic process oil | 100 parts |
| Stearic acid | 1 part |
| Zinc oxide | 5 parts |
| Vinyl alcohol-sodium acrylate copolymer | 10 parts |

Water-swelling sealants of Comparative Examples 2 to 4 were prepared in a similar manner as in Comparative Example 1, except that the vinyl alcohol-sodium acrylate copolymer was used in the amounts shown in Table 3.

TABLE 3

| Comparative Example | Vinyl alcohol-acrylic acid copolymer |
|---|---|
| 2 | 30 parts |
| 3 | 50 parts |
| 4 | 100 parts |

In Comparative Examples 5 to 8 described hereinbelow, polyolefinpolyols were used instead of the addition product of polyolefinpolyol and ethylene oxide.

COMPARATIVE EXAMPLE 5

One hundred (100) parts by weight of polyolefinpolyol containing hydroxyl groups at the molecular terminals thereof and having an average molecular weight of 1,000 to 5,000, 100 parts by weight of vinyl alcohol-sodium acrylate copolymer, 30 parts by weight of FEF carbon black and 20 parts by weight of paraffinic process oil (softening agent) were kneaded in an 8 inch open roll at a temperature of 30° C. for 10 minutes.

In the above kneading, "Polytail-HA" (trade name by Mitsubishi Chemical Industries, Ltd.) was used as said polyolefinpolyol and "Sumika Gel SP-520" (trade name by Sumitomo Chemical Co., Ltd.) was used as said vinyl alcohol-sodium acrylate copolymer.

To the kneaded product was added 15 parts by weight of 1,6-hexamethylenediisocyanate, and the resulting mixture was heated at a temperature of 150° C. for 1 hour to give a water-swelling composition.

Water-swelling compositions of Comparative Examples 6, 7, 8 and 9 were prepared in a similar manner as above, except that Sumika Gel SP-520 was used in the amounts shown in Table 4.

COMPARATIVE EXAMPLE 9

A water-swelling composition was prepared in a similar manner as in the preparation of Water-Swelling Compasition A, except that 300 parts by weight of "Sumika Gel SP-520" was used per 100 parts by weight of "MKU-111." (Other components were used in the same amounts.)

TABLE 4

| Comparative Example | Sumika Gel SP-520 |
|---|---|
| 6 | 30 parts |
| 7 | 50 parts |
| 8 | 100 parts |

The thus prepared Water-Swelling Compositions A to F and the water-swelling compositions prepared in Comparative Exaples 1 to 9 were cut into a size of 10×10×10 mm. The cut samples were immersed into a water of 23° C., and their swelling percentages and swelling rates were measured. Results obtained are shown in Table 5. In the table, numerical figures indicate their swelling percentages based on weight calculated in accordance with the following equation:

$$\text{Swelling percentage} = \frac{(\text{Weight after swelling}) - (\text{Weight before swelling})}{(\text{Weight before swelling})} \times 100\ (\%)$$

It would be understood from the results shown in Table 5 that Water-Swelling Compositions A to F have swelling percentages and swelling rates far greater than those of the compositions according to the prior arts shown in Comparative Examples 1 to 5, as well as those of the compositions prepared in Comparative Examples 6 to 8. The sample prepared in Example 9 had an excessive swelling percentage and was unable to maintain its original shape.

As many apparently widely different embodiments of this invention may be made without departing the spirit and scope thereof, it is to be understood that the invention is not limited to the specific embodiments thereof except as defined in the appended claims.

TABLE 5

| | Samples/Times (Hrs) | | | | | | | | |
|---|---|---|---|---|---|---|---|---|---|
| | 0.5 | 1 | 2 | 3 | 24 | 48 | 72 | 150 | 240 |
| A | 20 | 55 | 145 | 150 | 151 | 150 | 152 | 151 | 152 |
| B | 60 | .166 | 440 | 450 | 455 | 450 | 450 | 460 | 450 |
| C | 200 | 500 | 1300 | 1320 | 1320 | 1330 | 1340 | 1320 | 1310 |
| D | 350 | 910 | 2000 | 2120 | 2100 | 2110 | 2110 | 2120 | 2120 |
| E | 400 | 1050 | 2430 | 2400 | 2420 | 2410 | 2410 | 2420 | 2420 |
| F | 430 | 1180 | 2670 | 2690 | 2670 | 2680 | 2680 | 2670 | 2670 |
| Comparative Example 1 | 12 | 15 | 18 | 22 | 34 | 50 | 57 | 77 | 91 |
| Comparative Example 2 | 15 | 18 | 22 | 25 | 51 | 64 | 73 | 95 | 116 |
| Comparative Example 3 | 17 | 21 | 26 | 30 | 56 | 73 | 83 | 106 | 125 |
| Comparative Example 4 | 22 | 26 | 33 | 40 | 75 | 94 | 109 | 145 | 166 |
| Comparative Example 5 | 9 | 12 | 15 | 18 | 32 | 46 | 53 | 74 | 88 |
| Comparative Example 6 | 11 | 14 | 18 | 22 | 47 | 60 | 70 | 92 | 110 |
| Comparative Example 7 | 13 | 17 | 22 | 25 | 52 | 68 | 79 | 102 | 121 |
| Comparative Example 8 | 18 | 22 | 28 | 36 | 70 | 90 | 105 | 140 | 161 |
| Comparative Example 9 | 500 | 1320 | 2980 | (Note) | (Note) | (Note) | (Note) | (Note) | (Note) |

Note:
The original shape of the sample was not maintained as a result of swelling.

What is claimed is:

1. A water swelling composition comprising from 5 to 200 parts by weight of a vinyl alcohol-sodium acrylatate copolymer and from 5 to 50 parts by weight of isocyanate, per 100 parts by weight of an addition product of a polyolefinpolyol having hydroxyl groups at the terminuses of the polyolefinpolyol molecules, having an average molecular weight of from 1000 to 5000, and having greater than 90% saturation of the main chain, and ethylene oxide.

2. A water-swelling sealant comprising from 5 to 200 parts by weight of a vinyl alcohol-sodium acrylate copolymer and from 5 to 50 parts by weight of isocyanate, per 100 parts by weight of an addition product of a polyolefinpolyol having hydroxyl groups at the terminuses of the polyolefinpolyol, having an average molecular weight of from 1000 to 5000, and having greater than 90% saturation of the main chain, and ethylene oxide.

* * * * *